United States Patent [19]
Cowen et al.

[11] Patent Number: 4,509,827
[45] Date of Patent: Apr. 9, 1985

[54] REPRODUCIBLE STANDARD FOR ALIGNING FIBER OPTIC CONNECTORS WHICH EMPLOY GRADED REFRACTIVE INDEX ROD LENSES

[75] Inventors: Steven J. Cowen; Christopher M. Young, both of San Diego, Calif.

[73] Assignee: The United States of America as represented by the United States Secretary of the Navy, Washington, D.C.

[21] Appl. No.: 463,097

[22] Filed: Feb. 2, 1983

[51] Int. Cl.³ ............................................... G02B 7/26
[52] U.S. Cl. ................................. 350/320; 350/96.18; 350/96.20; 356/138
[58] Field of Search ............... 350/96.15, 96.18, 96.20, 350/96.21, 320; 356/73.1, 138, 152, 153

[56] References Cited
U.S. PATENT DOCUMENTS

| | | | |
|---|---|---|---|
| 3,554,653 | 1/1971 | Zielke et al. | 356/153 |
| 3,938,895 | 2/1976 | Bridger et al. | 356/152 |
| 3,995,935 | 12/1976 | McCartney | 350/96.15 |
| 4,119,362 | 10/1978 | Holzman | 350/96.18 |
| 4,183,618 | 1/1980 | Rush et al. | 350/96.18 |
| 4,186,998 | 2/1980 | Holzman | 350/96.21 |
| 4,190,316 | 2/1980 | Malsby et al. | 350/96.18 |
| 4,213,677 | 7/1980 | Sugimoto et al. | 350/96.18 |
| 4,215,937 | 8/1980 | Borsuk | 356/73.1 |
| 4,398,791 | 8/1983 | Dorsey | 350/96.18 |

Primary Examiner—John Lee
Attorney, Agent, or Firm—Robert F. Beers; Ervin F. Johnston; Thomas Glenn Keough

[57] ABSTRACT

A method of fabricating an optically aligned coupling between an optical fiber and a connector having a precision-bored bushing guarantees proper light beam collimation. Graded refractive index rod lenses are coupled to the optical fiber by an installation procedure having a readily-reproducible measurement standard. Calibrating an alignment fixture calls for the inserting of a fused quartz right cylinder having a diameter to allow a snug fitting in the precision-bored bushing. The cylinder has an integral axially exposed mirrored face for reflecting the beam to create a calibration autocollimation with a beam from a laser projected through and in parallel with the axis of the precision-bored bushing. Disposing a mirror surface separated from and perpendicular to the axis of the precision-bored bushing allows the reflection of the projected beam back over its own path to result in autocollimation of the projected and reflected beams. Inserting a close fitting graded refractive index lens into an alignment ferrule that goes into the precision-bored bushing and exciting the optical fiber by a light source permits the positioning of the excited optical fiber on an axially exposed surface of the graded refractive index lens. Next, the light intensity reflected through the graded refractive index lens and into the optical fiber from the mirror surface is monitored and, when the monitored light is maximum, the fiber is secured in place on the surface of the graded refractive index lens to assure the optically aligned coupling.

5 Claims, 5 Drawing Figures

REPRODUCIBLE STANDARD FOR ALIGNING FIBER OPTIC CONNECTORS WHICH EMPLOY GRADED REFRACTIVE INDEX ROD LENSES

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This is related to copending U.S. patent application Ser. No. 333,152 by Steven J. Cowen entitled "Generalized Coupler Realization for Use in Fiber Optic Systems" (now abandoned) and U.S. patent application Ser. No. 322,808 by Steven J. Cowen entitled "Hermetic High Pressure Fiber Optic Bulkhead Penetrator".

BACKGROUND OF THE INVENTION

It is well known that graded refractive index rod lenses (GRIN) of one quarter nominal pitch length provide low insertion loss, fiber optic connectors by virtue of their property of expanding and collimating the light beam profile emanating from the core of an optical fiber. Such GRIN lenses are in widespread use and may be a light focusing glass device marketed by the Nippon Sheet Glass Co. and Nippon Electric Co. limited, Opaca, Japan under the trademark SELFOC. The SELFOC GRIN lenses are versatile, see, for example, the first listed pending U.S. patent application listed above.

The GRIN lenses create a mated connector assembly which is much less sensitive to translational errors (tolerances) which are otherwise due to imperfections in the alignment mechanism and of the connector body itself. Such connector assemblies are potentially useful for communications systems having small-core (i.e. 50 micrometer) optical fibers (small fibers are more sensitive to alignment errors).

Referring to FIG. 1, a mated pair of fiber optic connectors are depicted which employ GRIN rod lens collimators. A bushing 10 has a pair of ferrules, 11 and 12 receiving optical fibers 13 and 14. The fibers are potted in place at 15 and 16 to align with and match a pair of the GRIN lenses 17 and 18. An index matching fluid 19 is included to assure a somewhat more acceptable coupling between the two sets of optic fiber-GRIN connectors.

A hermetic, high pressure undersea penetrator also brings optical fibers and GRIN lenses together and is disclosed in the second referenced U.S. patent application above. Optical signals are transferred through a pressurized hull and, at least in principle, this fiber optic connector is capable of minimizing optical insertion loss attributed to optical fiber drawing imperfections and consequent core eccentricity within the optical fiber cladding. Hopefully, the physical location of the core of the optical fiber on the surface of the rod lens is adjusted at the time of connector fabrication and installation to provide optimum light beam collimation without resorting to mechanisms which must physically index to the outside of the fiber cladding.

Unfortunately, unless some type of measurement standard is relied upon during the adjustment process, connectors such as those shown in FIG. 1 and disclosed in the referenced related patent applications can only be manufactured in matched pairs; the location of the "receiving" fiber on the face of its corresponding rod lens must be adjusted in order to maximize the light capture from the "transmitting" fiber which is installed with a complimentary connector. In practice, a "good" connector is often employed as a quasistandard, and subsequent connectors are adjusted to mate with it, in the hope that the resulting connectors will efficiently mate with one another. Besides the obvious problem of defining what is a "good" connector, to serve as a standard, a practical difficulty arises when multiple standards are required so that interchangeable connectors can be installed by a variety of users for a variety of purposes. Due to unavoidable errors in defining and maintaining a repeatable standard, the realized connector performance is degraded with respect to the true potential of the design when referred to a matched connector pair. Even matched pairs will, in general, be sensitive to rotational motion within the alignment sleeve because no effort is originally made to adjust the axis of the collimated light beam so that it is exactly parallel to the connector ferrule, by which the connector is mechanically referenced to the outside world.

Clearly, a reproducible standard, definable by physical qualities such as linear measurements and angles is required to maximize connector performance and ensure interchangeability by assuring optimum fiber placement during the alignment process at the time of connector installation. The proper alignment technique therefore, must guarantee that each connector emit a properly collimated light beam which is, for all practical purposes, parallel to the connector ferrule.

Thus, a continuing need exists in the state of the art for a method of fabricating an optically aligned coupling between an optical fiber and a connector which is reproducible and capable of being installed by different users under a variety of conditions to provide optimum signal transfer.

SUMMARY OF THE INVENTION

The present invention is directed to providing a method of fabricating an optically aligned coupling between an optical fiber and a connector having a precision-bored bushing. The method first calls for there being a calibrating of the optically aligned coupling by inserting a glass or fused quartz right cylinder having a diameter to allow a snug fitting in the precision-bored bushing and further having an integral axially exposed mirrored surface for reflecting a laser beam to create a calibration autocollimation. After the right cylinder has been removed, the beam is projected through and in parallel with the axis of the precision-bored bushing. A mirror surface is disposed, separated from and perpendicular to an axial projection of the axis of the precision-bored bushing to reflect the projected beam back over its own path to result in autocollimation of the projected and reflected beams. A graded refractive index lens which has been inserted into a close fitting precision-bored bushing and an optical fiber are excited by a light source. Positioning the excited optical fiber on an axially exposed surface of the graded refractive index lens and monitoring the light intensity reflected through the graded refractive index lens and into the optical fiber from the mirror surface by use of a directional coupler enables the securing of the optical fiber at a location on the axially exposed surface where the magnitude of the monitored reflected light is maximum to assure the optically aligned coupling.

It is a prime object of the invention to provide an improvement in the method of aligning an optical fiber with a lens.

Another object is to provide a method for assuring a maximum coupling of optical energy to and from an optical fiber through a lens.

Still another object of the invention is to provide an optical fiber alignment on the surface of a GRIN lens with respect to an entire connector assembly which is automatically guaranteed in a positive and repeatable fashion.

Still another object is to provide a method for fiber-lens alignment that is potentially superior to that of any other practical alignment technique.

Still another object is to provide for the full interchangeability of connectors even those installed using different installation fixtures due to the reproducibility of the method of alignment.

Still another object is to provide an optically aligned coupling that is insensitive to rotation in the alignment bushing due to the high degree of parallelness in the output beam with respect to the connector alignment ferrule.

Yet another object is to provide a method of fabricating an optically aligned coupling that relies only upon readily measured and specified linear and angular tolerances for its accuracy thereby making the method readily reproducible.

Still another object is to provide a method of fabricating an optically aligned coupling relying upon an apparatus that is compact so that the potential for field installation of GRIN lens-fiber optical connectors is readily realizable.

A further object is to provide a method relying upon a single reference standard suitable for calibrating any number of installation fixtures thereby minimizing the number of precision quartz rods which must be produced.

These and other objects of the invention will become more readily apparent from the ensuing description and claims when taken with the appended drawings.

DESCRIPTION OF THE PREFERRED EMBODIMENTS

Figure 1:
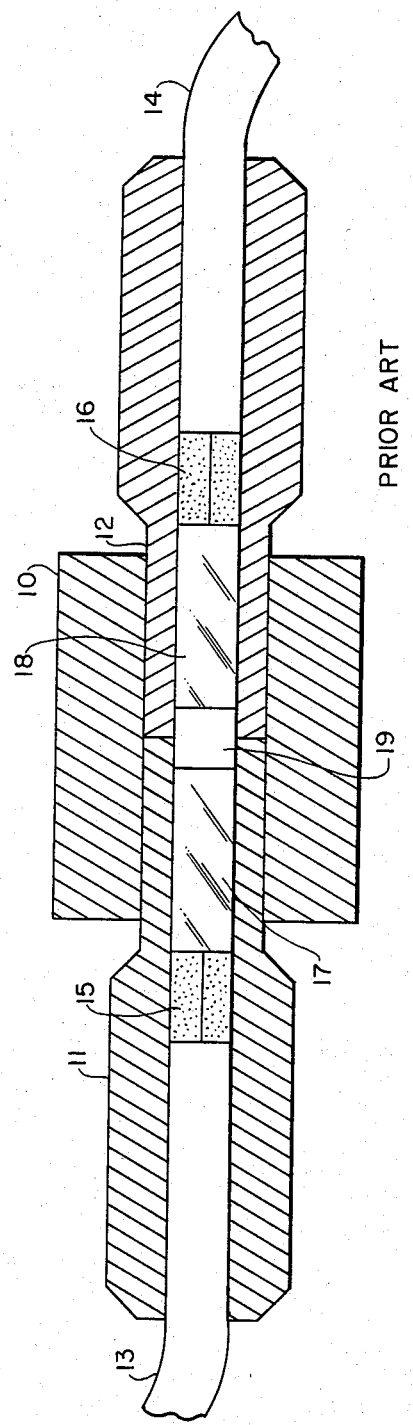
FIG. 1 depicts a functional diagram of a mated pair of fiber optic connectors which employ GRIN lenses as optical collimators.
Figure 2:
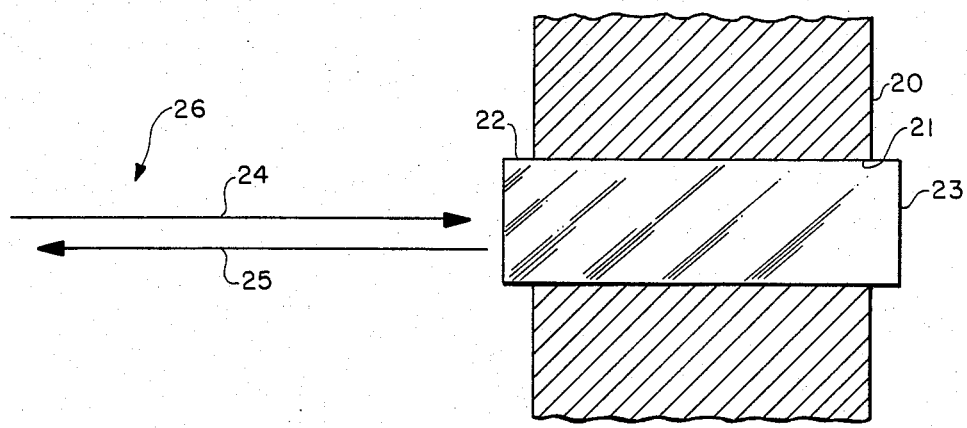
FIG. 2 shows the precision alignment bushing filled with a quartz reference standard to permit laser beam alignment whereby after adjustment the laser beam is parallel to the bore of the bushing.
Figure 4:
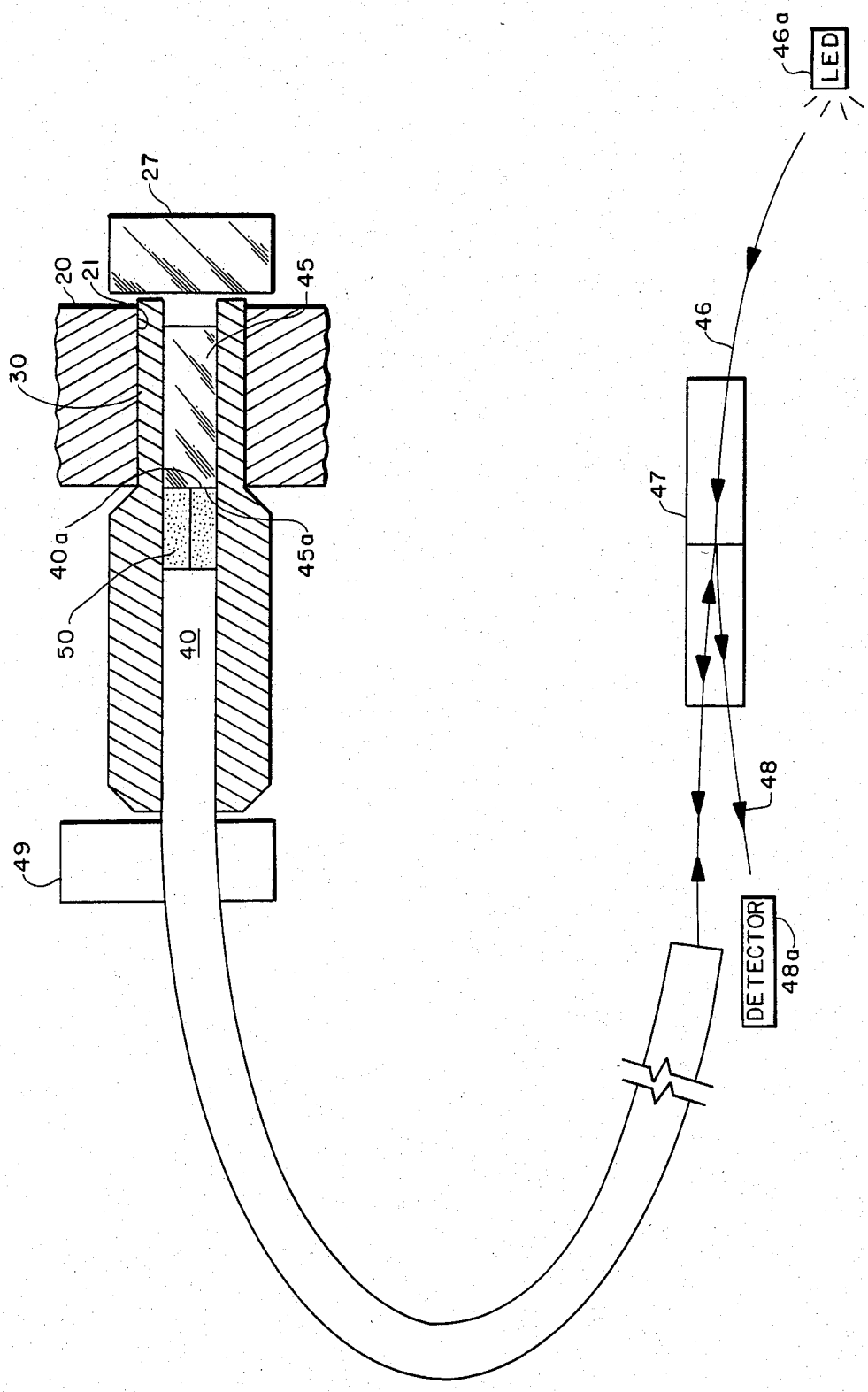
FIG. 4 shows a connector undergoing installation that is inserted into a fixture. A directional coupler is included to separate the bidirectional light components traveling toward and from the connector and alignment fixture.
Figure 5:
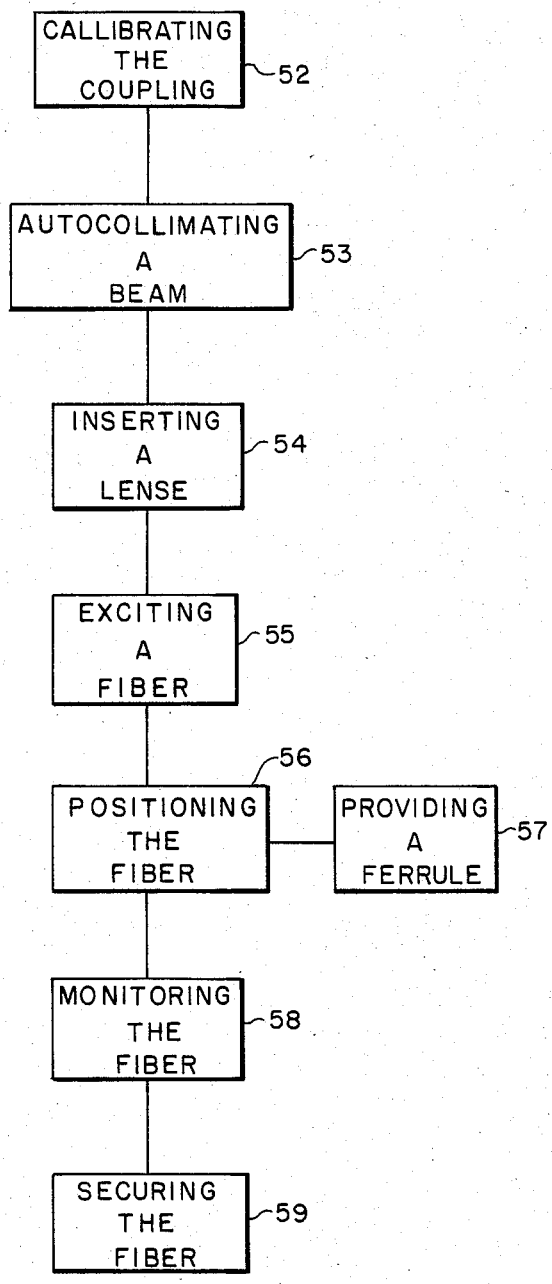
FIG. 5 shows the method of the invention.

Referring to the drawings and in particular to FIG. 2, the alignment technique of this inventive concept makes use of a stable and readily calibrated alignment fixture to permit optimum connector installation. The fixture employs a bushing 20 provided with a precision bore 21. The precision-bored bushing maintains a close tolerance slip-fit to the outside diameter of an alignment ferrule 30, see FIG. 4, of the portion of the connector installed on a fiber optic cable 40.

A master reference rod 22 in the form of a right cylinder is inserted in bore 21 of the precision-bored bushing. The rod has a diameter equal to that of alignment ferrule 30 and a mirrored face 23 is provided that is as perpendicular to its axis as the state of the art permits. Fused quartz or optical glass is a suitable material for use as the master reference rod because it is highly stable with time and temperature and it can be ground and polished with an extremely high degree of precision. Its mirrored face is formed according to well established procedures in the art and, as such, can function as a master standard and alignment fixture readily certified and duplicated in repeatable fashion to fit in differently sized precision-bored bushings for the purposes to be elaborated on below.

As mentioned, the master reference rod is snugly fitted in the precision-bored bushing to serve to calibrate an optically aligned coupling. A laser beam 24, coming, for example, from a helium neon laser, is reflected 25 from mirrored surface 23 of the master reference rod while the angular position of the precision bored bushing is adjusted to result in autocollimation 26 of the beams (that is, the laser beam is returned in its own path). Because a long base line is selected for autocollimation, a very high degree of precision is obtainable in practice. Alternatively, a commercial-optical autocollimator could be used for this function.

Figure 3:
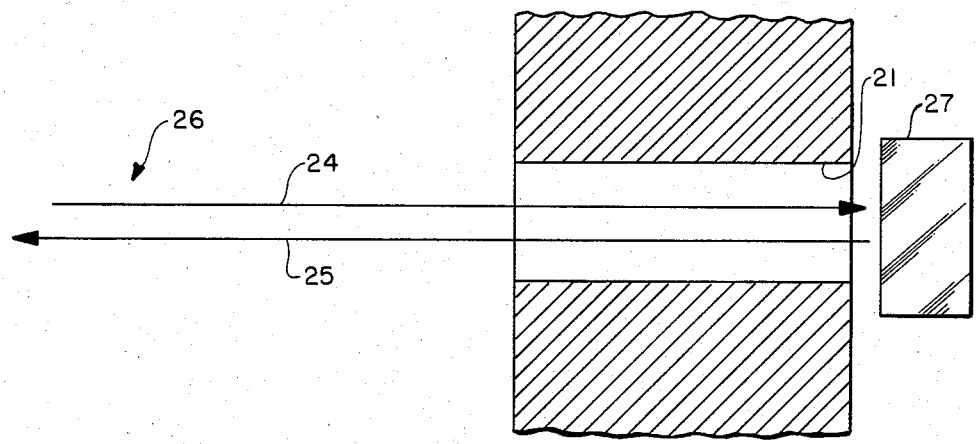
FIG. 3 shows a mirror in an adjustable amount which is aligned to produce an autocollimated laser beam (when so adjusted the mirror is perpendicular to the bore of the precision-bored bushing).

Looking to FIG. 3, reference rod 22 is removed and an adjustable mirror 27 is placed in a position axially aligned with bore 21. The tilt angle of the mirror is adjusted to again achieve beam autocollimation 26. Since only a small angular adjustment is required in order to bring the mirror into perpendicularity, a laser mirror mount can be used for this application such as a Model 1435 Laser Cavity Mirror Mount distributed by Oriel Inc. Such a device is capable of permitting a resolution of one arc second and is extremely stable with time and might never require readjustment once it is initially aligned. Once the tilt mirror has been aligned it is a relatively simple procedure to check the condition of its alignment. Simply reinstall reference rod 22 in the bushing and check for calibration autocollimation as before.

Upon completion of this calibration procedure, mirror 27 can be expected to be as perpendicular to the center line of bore 21 of the precision-bore bushing as the manufacturing tolerances of the master alignment rod permit. The GRIN lens is held in the ferrule 30. A suitable GRIN lens is the SELFOC lens marketed by Nippon Sheet Glass Co. under the designation SELFOC type SLS, 2 millimeter, one quarter pitch.

Alignment ferrule 30 of the connector to be installed on fiber optic cable 40 is snugly fitted into bore 21 of precision-bored bushing 20. The end of the fiber optic cable reaches to the inner end of the ferrule and is brought into the close proximity of the GRIN lens. An optical fiber such as an ITT type T212 having a 50 micron diameter graded index core is a suitable optical fiber for this application.

The fiber is excited by light 46 coming, for example, from a light emitting diode 46a emitting at a wavelength of interest. An RCA type C30123 edge emitting LED, emitting at an optical wavelength of 0.83 microns, is a satisfactory light source.

The light is fed to a directional coupler 47 which is fabricated to separate components of light traveling in opposite directions through an optical fiber. A representative directional coupler having a low insertion loss and a high directivity is disclosed in the above referenced pending U.S. patent application Ser. No. 333,152 although an optical switch of the type disclosed by Walter J. Thomlinson III et al in U.S. Pat. No. 4,208,094 could function satisfactorily for this intended application.

Light signal 46 launched by the light emitting diode is routed through coupler 47, through optical fiber 40 and to GRIN lens 45 in the connector body while light 48 is returned from the connector assembly (i.e. light reflected from mirror 27) to a photodetector 48a. The photodetector converts the returned light energy into an electrical signal proportional to the optical power of the returned light. A type PV-100 photodetector manufactured by E.G.&G. has functioned satisfactorily for this purpose.

Optical fiber 40 has its end surface 40a prepared by scribing and fracture or by polishing. It is carefully moved over surface 45a of the GRIN lens using a micropositioner 49 until a maximum optical signal is detected by photodetector 48. A typical micropositioner is a model A micropositioner manufactured by the Line Tool Co. This device lends itself to being iteratively adjusted to maximize the returning light signal. A closed-loop control system might be added to make alignment automatic and very fast.

This position where the reflected light is optimized on the surface 45a of the GRIN lens corresponds to the proper fiber position in the GRIN lens connector. When this position has been established, the fiber is fastened in place in a permanent fashion by a potting of the end in a suitable adhesive 50. An epoxy such as that manufactured by Bacon Industries, type 20-20 or a UV curable adhesive such as NORLAND type 61 is suitable for permanently fixing the fiber in place on the face of the GRIN lens.

The optical fiber positioning is indeed the optimum location for the optical fiber to be. When the connector is optically aligned, it must be definition transfer maximum optical power to another optimally aligned connector which is in perfect registration with respect to the connector axis. The connector "sees" a conjugate image of itself in the mirror integral to the alignment fixture. In effect, the connector is aligned with itself. Because the mirror is as perpendicular as the state-of-the-art permits with respect to the axis of the connector ferrule, nearly perfect registration is achievable in practice. The beam of optical energy launched by the GRIN lens is directed toward the mirror, which returns it having a reflection angle opposite in sign to any angular error of the emitted light beam with respect to the connector axis. When a maximum reflection occurs, the beams are parallel to the walls of the connector ferrule.

However, any angular offset of the end of the fiber causes a proportional shift in the image formed in the plane of the optical fiber with respect to the fiber itself. Any misalignment from the optimum condition, therefore, results in considerable light loss and is readily detectable when the angular error (hence the positional error as well) is identically zero; the reflected light beam is imaged directly onto the fiber which was utilized to launch the light, resulting in a maximized, reverse propagating light component which is routed to the photodetector by the directional coupler.

The disclosed concept lends itself ideally to alignment of lenses and cables to permit optimum adjustment of connectors designed to image through thick glass windows such as those found in a high pressure undersea penetrator for an optical fiber. The entire assembly can be provided with an index matching fluid in order to accurately match the connectors.

What has been disclosed is a novel method of fabricating an optically aligned coupling between an optical fiber and a connector. First, there calls for the calibrating 52 of the coupling and the autocollimating 53 of a beam projected from a laser and reflected from a tiltable mirror. Inserting 54 a lens and exciting 55 of a fiber from another light source enables the positioning 56 of the fiber on the face of the GRIN lens by providing 57 a ferrule and suitably employing a micropositioner. Monitoring 58 the magnitude of the signal reflected from the mirror provides an indication of the maximum reflected light at which point a securing 59 of the fiber in place on the GRIN lens is made via a conventional adhesive to complete the fabrication of the optically aligned coupling.

Obviously many modifications and variations of the present invention are possible in the light of the above teachings. It is therefore to be understood that within the scope of the appended claims the invention may be practiced otherwise than as specifically described.

What is claimed is:

1. A method of fabricating an optically aligned coupling between an optical fiber and a connector having a precision-bored bushing comprising:

autocollimating a projected beam from a laser with a reflected beam emanating from the same laser and reflected from a surface through and parallel with the axis of the precision-bored bushing, the step of autocollimating includes the projecting of a beam from a laser through and parallel with the axis of the precision-bored bushing and disposing a mirror surface separated from and as nearly perpendicular to an axial projection of the axis of the precision-bored bushing as the state-of-the-art allows to reflect the projected beam back over its own path to result in autocollimation of the projected and reflected beams;

inserting a close fitting graded refractive index lens into an alignment ferrule sized to fit in the precision-bored bushing;

exciting the optical fiber by a light source;

positioning the excited optical fiber in the alignment ferrule and on an axially exposed surface of the graded refractive index lens;

monitoring the light intensity reflected through the graded refractive index lens and into the optical fiber from a mirror surface;

changing the fiber's position on the axially exposed surface; and securing the optical fiber at a location on the axially exposed surface where the magnitude of the monitored light is maximum to assure the optically aligned coupling.

2. A method according to claim 1 further including:

calibrating the optically aligned coupling by inserting a fused quartz right cylinder having a diameter to allow a snug fitting in the precision-bored bushing and further having an integral axially exposed mirrored face for reflecting the projected beam to create a calibration autocollimation prior to the step of autocollimating.

3. A method according to claim 2 in which the step of positioning includes the providing of a ferrule about the optical fiber having a diameter substantially equal to the bore of the precision-bored bushing.

4. A method according to claim 3 in which the step of changing includes adjusting a micropositioner to maximize the monitored light.

5. A method according to claim 4 further including:
interposing a directional coupler in the optical fiber to allow a simultaneous exciting and monitoring through the optical fiber.

* * * * *